Figure 1:
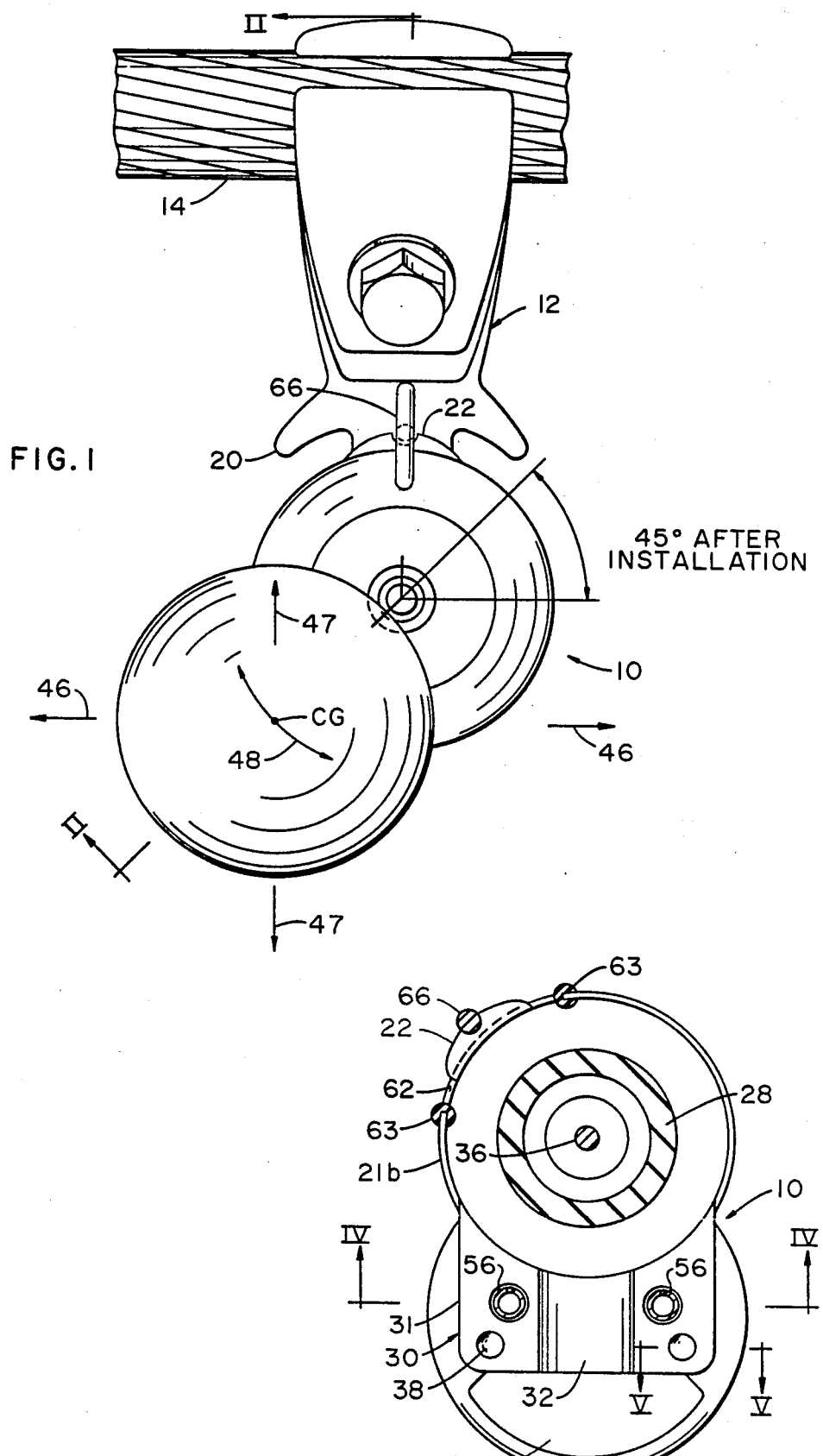

United States Patent [19]

Hawkins

[11] Patent Number: 4,714,799

[45] Date of Patent: Dec. 22, 1987

[54] OVERHEAD CONDUCTOR DAMPER WITH STAMPED AND SAND-CAST PARTS

[75] Inventor: Ronald G. Hawkins, Massena, N.Y.

[73] Assignee: Aluminum Company of America, Pittsburgh, Pa.

[21] Appl. No.: 805,819

[22] Filed: Dec. 6, 1985

[51] Int. Cl.⁴ .............................................. H02G 7/14
[52] U.S. Cl. ..................................... 174/42; 188/379
[58] Field of Search .................. 174/42; 188/378, 379; 264/150, 159

[56] References Cited

U.S. PATENT DOCUMENTS

| | | | |
|---|---|---|---|
| 2,770,841 | 11/1956 | Cooke et al. | 264/150 X |
| 3,632,705 | 1/1972 | Makowski | 264/150 X |
| 4,527,008 | 7/1985 | Hawkins et al. | 174/42 |
| 4,554,402 | 11/1985 | Hawkins et al. | 174/42 |

Primary Examiner—Laramie E. Askin
Attorney, Agent, or Firm—Elroy Strickland

[57] ABSTRACT

A device for damping vibrations of an overhead conductor. The device comprises opposed weight halves, each having spherical outside surfaces. The halves are made of a relatively heavy metal material cast in a sand-casting mold. A housing structure is provided that is made from two stamped halves of lightweight metal. The lower portions of the housing halves are located and secured between the weight halves. The stamped halves resiliently secure opposed hollow elastomer damping members between a sand-cast clamp arm and opposed inside surfaces of the housing structure. Pin means wholly located within the weight halves secure the weight halves and stamped halves together, the housing structure retaining the hollow damping members between the stamped halves and clamp arm.

23 Claims, 11 Drawing Figures

OVERHEAD CONDUCTOR DAMPER WITH STAMPED AND SAND-CAST PARTS

BACKGROUND OF THE INVENTION

The present invention relates generally to damping devices for damping the vibration of overhead conducters, and particularly to a low-cost, corona-free damping device that takes the place of the well-known Stockbridge-type damper, the device of the subject invention having many advantages thereover.

The inventor of the present disclosure is named in two previous patent applications directed to damping devices for overhead conductors that employ elastomer damping elements in a compact manner, namely, U.S. Ser. No. 565,180, filed Dec. 23, 1983, now U.S. Pat. No. 4,527,008 and a continuation-in-part application thereof, Ser. No. 718,549, filed Apr. 1, 1985 now U.S. Pat. No. 4,554,402. In addition, this application is being simultaneously filed with a second application by the inventor, entitled "Damping Device With Die Cast Components", U.S. Ser. No. 805,818, filed Dec. 6, 1985.

As is known, manufacturing companies in an industry look for economies in manufacture and improvements in the performance of their products in order to meet competition. In the case of elastomer-type damping devices employing inertial weights attached to overhead conductors, the weights and clamp arms thereof are usually die cast. The machinery and die cavities employed to die cast components are costly, and in the case of overhead dampers, which are required to dampen the vibration of a multitude of conductor sizes (diameters) the cost is substantial, i.e., there are over 350 conductor sizes in commercial use which require 21 clamp sizes.

BRIEF DESCRIPTION OF THE INVENTION

The present invention is directed to a highly compact damping device having extremely low-cost components and causing little or no corona when attached to a high voltage transmission line conductor. More particularly, the damping device of the invention comprises a sand-cast clamp arm for attaching to an overhead conductor, a housing structure comprised of opposed stamped halves, such stamped halves being resilient so that they easily care for tolerances of the components of the device in the course of the manufacture thereof. The stamped halves secure two elastomer cylinder members between the stamped halves and clamp arm, which in turn are secured between two opposed identical inertial weight halves. The weight halves are secured together by two roll pins wholly contained within the mass of the weight halves.

The weight halves are also sand-cast items made in an inexpensive sand-casting mold and are provided with identical reductions of the weight material in a manner that accommodates a lower portion of the stamped housing and provides a center of gravity for the damping device at the radial center of the weight halves. The stamped halves are thin-walled and light in weight so that they do not affect the location of the center of gravity and the radius of gyration of the damping device, which gyration has three degrees of freedom when the conductor to which the device is attached vibrates.

The sand-cast parts, as opposed to die-cast parts, are substantially lower in cost. Similarly, thin-wall stamped parts are also inexpensive to make such that the cost of the damper of the present invention is low yet is efficient in performing the damping process. However, other important advantages result from the damper of the invention, as described in detail hereinafter.

THE DRAWINGS

Figure 2:
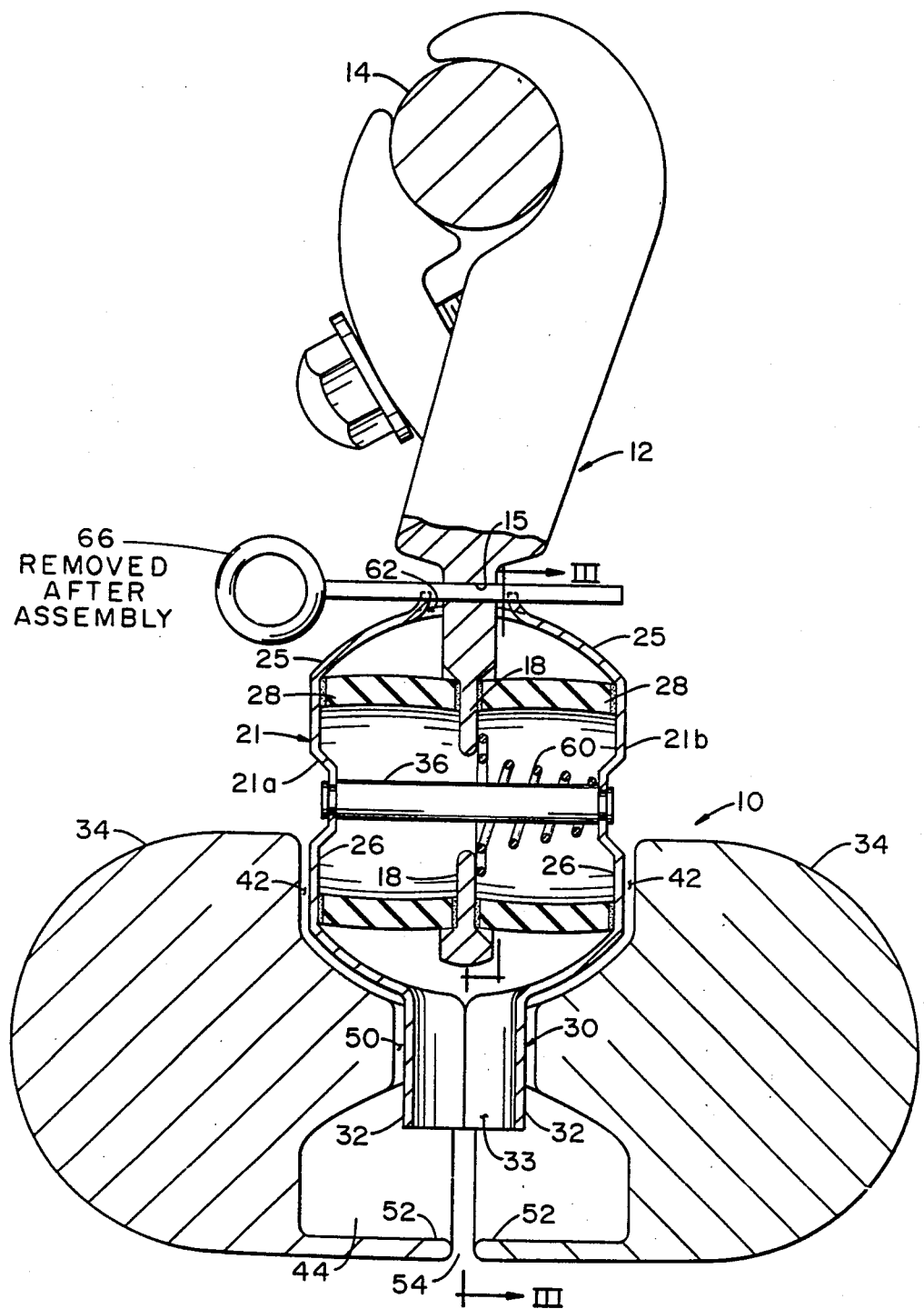
Figure 4:
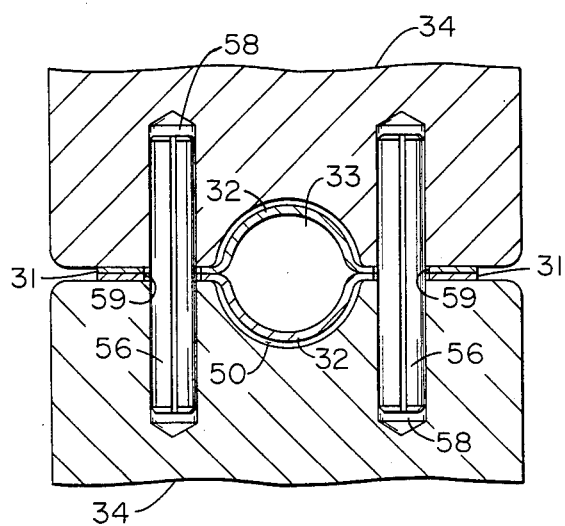
Figure 5:
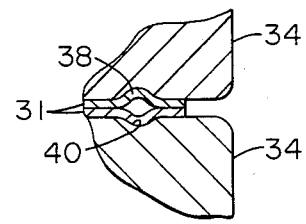
Figure 6:
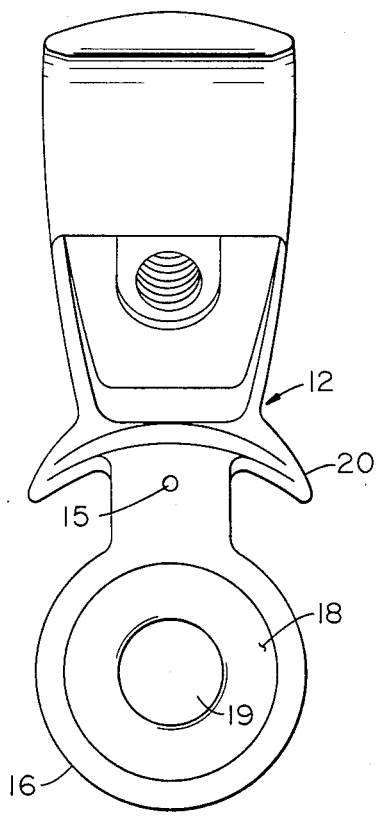
Figure 7:
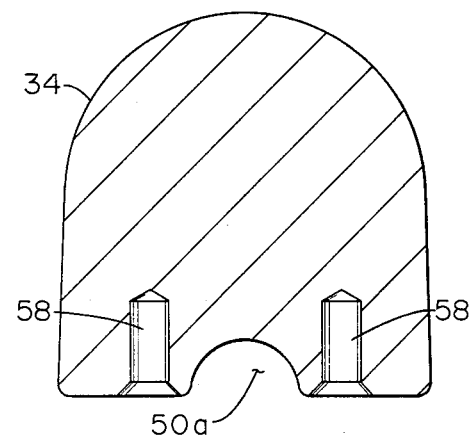
Figure 8:
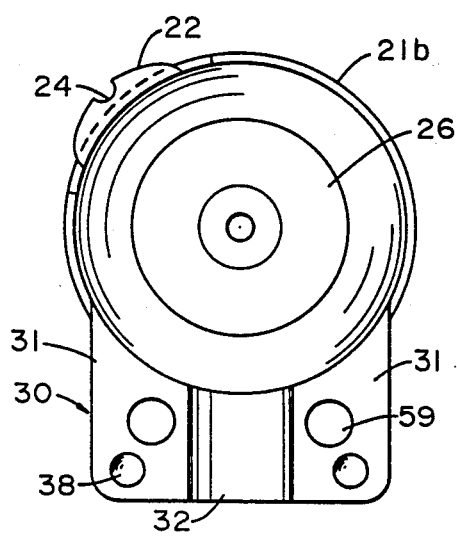
Figure 11:
Figure 9:
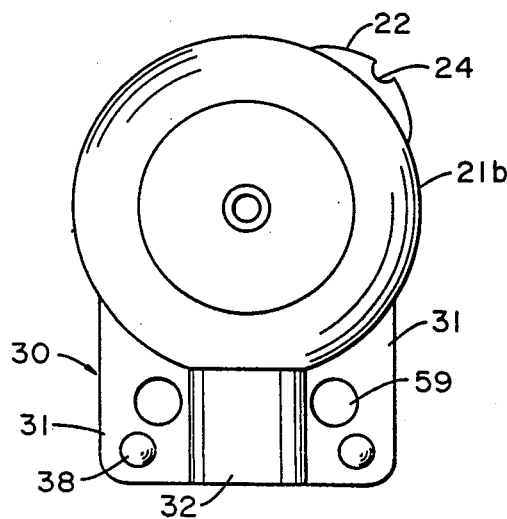
Figure 10:
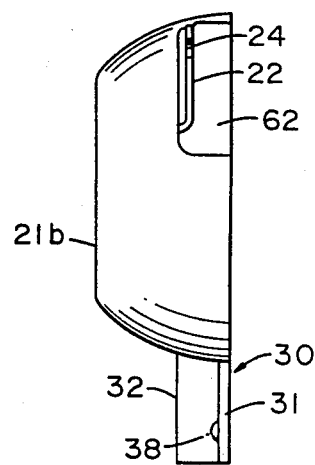

The invention, along with its objectives and advantages will be best understood from the following detailed description and the accompanying drawings in which:

FIG. 1 is an end elevation view of the damping device of the invention,

FIG. 2 is a sectional view of the device in FIG. 1 taken along lines II—II of FIG. 1, FIG. 3 is a view of the damping device of FIG. 2 taken along lines III—III in FIG. 2, FIG. 4 is a partial section of the damping device taken along lines IV—IV of FIG. 3, FIG. 5 is a partial section of the device of FIG. 3 taken along lines V—V thereof, FIG. 6 is a side elevation view of the clamping arm of the invention, FIG. 7 is a cross-sectional view of one of the identical weight halves of the invention showing two openings therein for receiving, respectively, two roll pins, FIGS. 8 and 9 are respectively inside and outside views in elevation of one of the stamped halves of the invention, FIG. 10 is a side elevation view of one of the stamped halves, and FIG. 11 shows in section an elastomer extrusion located on the edges of the stamped halves of the invention.

PREFERRED EMBODIMENTS OF THE INVENTION

Referring now to the drawings, FIGS. 1 and 2 thereof show the general configuration of the damping device of the invention, which device is generally designated by numeral 10. The device comprises a clamp arm 12 for attaching device 10 to an overhead conductor 14. The clamp arm is made in a low-cost manner by casting the same in a sand mold (not shown). As discussed above, the large number of conductor sizes requires a large number of clamp sizes and thus changes in casting apparatus. If such changes are made via die-cast machines, the cost of such is substantial in comparison to sand-casting techniques and apparatus. A machined, i.e. drilled, hole 15, however, is provided in the cast arm for reasons discussed below.

A comparison of the actual cost of sand and die-cast apparatus is helpful in appreciating the present invention. Sand-cast tooling runs about $2,000 per clamp size, while die-cast tooling is $25,000 per clamp size. 21 sand-cast clamps (see earlier discussion on clamp sizes) have a tooling expenditure of $42,000 versus $525,000 for 21 die-cast clamps.

The lower portion of clamp arm 12 is provided with an enlarged circular structure 16 (FIG. 6) having opposed planar surfaces 18 (FIG. 2). A center opening 19 can also be provided for reasons noted hereinafter. In addition, the arm is cast with an integral flange or skirt 20 that shields the opening from sunlight.

Clamp arm 12 is located in a housing structure 21 comprised of opposed halves 21a and 21b that are made in a press (not shown) that easily stamps and forms the halves from thin metal sheet in a mass-produced, accurate, low-cost manner. In the stamping process, each half of 21 is provided with an upper flange portion 22 and slot 24 therein for purposes explained hereinafter. The flanges and slots of the stamped halves are angularly located relative to the vertical of the structure of the stamped halves in a manner that locates the flanges and slots opposite each other but (again) offset from the vertical when the damper 10 is assembled. This requires two half structures (21a and 21b) as shown in FIG. 2 with one half having the flange 22 and slot 24 located at say a 45° angle with respect to the vertical, and the opposed flange and slot located at a 315° angle.

As shown in FIG. 2, the stamped halves are formed with upper wall portions 25 that are spherical in shape. The purpose of such a shape is to reduce corona stress and eliminate the occurrence of corona discharge when the damper of the invention is subject to the high voltage stresses of overhead transmission lines.

Still referring to the stamped halves, both halves are provided with cup-shaped wall portions and seats 26 in the stamping process. The seats form annular planar surfaces for receiving the planar ends of thin-wall tubular elastomer members 28 in the manner shown in FIG. 2, i.e., between the planar surfaces 18 of clamp arm 12 and the planar seats 26 of stamped halves 21a and 21b.

The lower portion of each stamped half includes an extension 30 comprised of planar wing portions 31 and an integral semi-circular trough 32 located between portions 31. When the stamped halves are assembled together in a manner shown in FIGS. 1 and 3, a tubular opening 33 is formed in the lower portion of the damper housing 21. Wings 31 of extensions 30 are shown in cross section in FIG. 4 of the drawings, and tubular opening 33 provides a "weep hole" for the draining of moisture and water that might enter the housing of the damper. The semi-circular troughs 32 also provide "rib stiffening" of the housing structure.

The stamped halves of housing 21 are secured together about elastomer members 28 and clamp arm 12 by securing opposed inertial weight halves 34 together in about the lower extensions 30 of the stamped halves in a manner presently to be explained. The stamped halves, however, can be secured together by a rivet pin 36 extending through the center of tubular elastomer members 28 and opening 19 in the clamp arm, the pin serving, in addition, as a stop means to prevent extreme relative movement of the clamp arm and housing structure; in this manner, damage to and destruction of elastomer members 28 are prevented when conductor 14 is subjected to violent movement.

The rivet pin embodiment also provides a sub-assembly module that is easily placed in an oven for drying adhesives employed in the invention. The use of adhesives is discussed in detail hereinafter.

The wing portions 31 of extension 30 are each provided with circular, ball-like protrusions 38 (FIG. 5), and the surfaces of weight halves 34 that abut against the wing portions, when the device is assembled, are provided with ball-shaped depressions 40 of a size (diameter and depth) similar to 38. When the damper is assembled and when protrusions 38 are seated in depressions 40, relative rotation of the weight halves and wing portions 31 is prevented. This places all loads in a direction perpendicular to the axes of 38 and 40 on the metal of 38 and 40.

The stamped structures, as thus far described, serve the important function (in addition to housing and protecting the elastomer members 28 from the elements outside of the housing) of a "tolerance eater," as the thin walls of the stamped structures are resilient and capable of flexing, i.e., changes in the dimensions of the components of damper 10 occurring in the course of making the components are accommodated by the resiliency of the walls of the stamped halves. In this manner, low-cost sand-cast components, whose tolerances are substantially greater than high-cost die-cast components, for example, can be used without adversely affecting damping performance of the damping elastomers. Similarly, any changes occurring in the lengths of the elastomer members are accommodated by the walls of 21 and by the thin walls of the elastomers themselves.

Weight halves 34 are made (cast) in a sand-cast mold (not shown) having rounded, spherical depressions that provide the outwardly facing ends of the halves with a spherical shape. Such a shape, as that of wall 25 of the stamped housing, produces little or no corona when subjected to the high voltage stresses encountered on overhead transmission lines.

As best seen in FIG. 2, each weight half has a dual, upper and lower area 42 and 44 of reduced material. The upper recuced area provides a clearance opening or recess that accommodates stamped housing 21. The size and locations 42 and 44 are matched such that the center of gravity CG (FIG. 1) of the weight halves is at or closely adjacent the longitudinal axes of the halves. The center of gravity and radius of gyration of the weight halves are not changed by the weight of housing structure 21, as it is made of a thin-wall, lightweight material, such as aluminum. The weight halves are made of a heavy material such as iron or zinc.

The location of the center of gravity is important in the functioning of device 10 as a damper of conductor vibration, as relative movement between clamp arm 12 and the mass of weight halves 34 can take place in vertical, horizontal and rotational directions, and combinations thereof, when the conductor vibrates. In FIGS. 1 and 2, these directions are indicated respectively by arrows 46, 47, and 48. The elastomer members 28 are worked by relative movement of 12 and 34 such that the energy of conductor vibration is dissipated to the atmosphere in the form of heat produced in the elastomer members.

As best seen in FIG. 2, tubular extension 32 of housing 21 extends through an opening 50 provided in the weight halves (when assembled together), and when wing portions 31 of 30 are sandwiched between the weight halves in the manner shown in FIG. 4. Opening 50 is provided when the weight halves are cast, i.e., each weight half is cast with a semi-circular depression 50a, as best seen in the cross sectional view of one weight half in FIG. 7.

The lower end of 32 and tubular opening 33 terminate in lower reduced area 44 of the weight halves and above opposed, thin-wall portions 52 of the weight halves. These wall portions do not meet such that an opening 54 is provided beneath 32 and 33 to (again) allow any moisture or water that may enter the housing to drain the damping device of the invention.

The components of the damper of the present invention, as thus described, are secured together by two roll pins 56 (FIG. 4) fixed in openings 58 (FIG. 7) provided in weight halves 34. Pins 56 extend through openings 59 provided in the wing portions 31 of the stamped halves to secure the stamped and weight halves together. It will be noted in FIG. 4 of the drawings that openings 59 are larger than the roll pins. The dimpled structures 38 and 40 provided in the wing portions and weight halves, as discussed earlier, prevent movement of the metal about holes 59 against the roll pins. The larger area of holes 59 further ensures against the engagement of the roll pins with the metal of 31 surrounding the roll pins.

The diameters of openings 58 in the weight halves are sized to squeeze the roll pins when they are inserted into 58 to firmly secure the roll pins therein and lock and secure the weight halves about the lower extension 30 of housing 21. In this manner, the stamped halves of the housing are secured together to secure elastomer members 28 between clamp arm 12 and the stamped halves. In addition, an open wound coil spring 60 (shown in dash outline in FIG. 2 and discussed in detail below) is secured between housing 21 and arm 12.

Openings 58 are drilled in the castings of 34, such drilling being the only machining operation involved in making the weight halves.

However, before the components of damper 10 are secured together by the roll pins, the ends of elastomer members 28 are joined to the planar surfaces 18 and 26 of the clamp arm and stamped halves by a layer of adhesive material (not visible in the drawings) applied to the surfaces. The adhesive material is elastic such that it does not stiffen the ends of the elastomer elements when the adhesive dries. A stiff, hard adhesive on or adjacent the ends of the elastomer members makes the same appear shorter than their actual lengths and provides a stress point for fatigue failure of the elastomer during cyclic working of the elastomer. The lengths and spring constants of the elastomer members are chosen to provide the necessary flexing capability for effective damping of conductor vibration. Preferably, the material of the elastomer members is pure silicone, with a small amount of a curing agent. A pure silicone adhesive material is flexible when dried and is compatible with the silicone of the elastomer members.

In addition, pure silicone material has essentially the same stiffness throughout a large range of ambient temperatures (i.e., about 115° F. to −40° F.) such that damping members 28 of device 10 are effective to dampen conductor vibration at extremely low temperatures.

The preferred configuration of elastomer members 28 is that of a cylinder with flat, planar ends, and an outside diameter that is greater than the length of the damping member. Such a configuration is highly stable when flexed and twisted in the damping process, and the ends thereof are highly resistant to being peeled from the planar surfaces of the clamp arm and stamped housing when glued thereto by a suitable adhesive, i.e., the planar ends present substantial areas for bonding and provide uniform bearing surfaces and pressures against the surfaces of the clamp arm and stamped housing.

As seen in FIG. 2, the walls of the damping members are relatively thin. Thin walls provide substantial surface areas for radiating heat therefrom when the members are worked. An overheated elastomer tends to lose its resilience and spring constant such that it is important for effective damping that members 28 remain relatively cool. Excessive heat accumulation in the elastomer also shortens the fatigue life of the elastomer.

When the hollow damping members are assembled with the clamp arm and stamped halves of the housing, coil spring 60 is disposed within one of the hollow members, as shown in FIG. 2, before the member is bonded to the stamped half. The uncompressed length of the spring is greater than the distance between the clamp arm and the stamped half of housing 21 (when the damper is assembled) to ensure physical and electrical contact with the clamp arm and stamped half. In this manner electrical continuity is maintained between the clamp arm and housing. If pin 36 is used, the pin extends through the center of the spring and centers the spring within the elastomer cylinder.

The material and gauge of the wire of spring 60 are chosen to provide an easily flexed structure that does not affect the damping effort of elastomer members 28. The material of the spring also has a low stress characteristic that permits a long fatigue life for the spring. A suitable material for spring 60 is phosphor bronze.

In addition, spring 60 is wholly enclosed and sealed in the damping member 28 such that the spring does not encounter external atmospheric elements that might adversely affect the spring and the electrical interface between the spring and surfaces 18 and 26 of the clamp arm and stamped halves.

When the weight halves 34 are abutted together in the manner of FIG. 4 and secured to the lower portion 31 of housing 21 by the roll pins 56, the upper surfaces of the weight halves created by the reduced areas 42 thereof are spaced from the sides of stamped halves 21a and 21b. This prevents the weight halves from engaging the upper portions of the stamped halves so that the flexible, spring-like character of the stamped halves is maintained. In this manner, as explained earlier, the stamped halves can function to care for reasonable tolerances occurring in the sand-casting of clamp arm 12 and in the lengths of the elastomer tubes 28. In other words, normal tolerances occurring in the casting of the weight halves will not affect elastomer compression in the stamped housing.

As seen in FIG. 2 of the drawings, the walls of elastomer members 28 bulge outwardly adjacent the longitudinal center thereof, as the uncompressed length of each member 28 is slightly longer than the distances between the clamp arm and the stamped halves of housing 21. This is particularly advantageous, as the outside diameters of 28 are increased at the location of maximum strain on 28 when vibration of the conductor occurs.

In addition, the strength of damping members 28 is increased by the capture of ambient air in the hollow of the members when the ends thereof are bonded to the surfaces of the clamp arm and stamped halves. A column of air is thus provided in each member 28 to support the walls of the members when they are worked.

As shown in FIGS. 2 and 3 of the drawings, the arm of clamp 12 extends through an upper opening 62 provided in the housing of the stamped halves, the opening being located adjacent the upper flanges 22 of the stamped halves. Opening 62 is formed from opposed cutout portions (FIG. 10) provided in the stamped halves when they are made (stamped), FIG. 10 depicting, in side elevation, one stamped half 21b with the cutout portion; the side elevation of stamped half 21a looks the same as 21b except that the cutout portion is circumferentially rotated to match that of 21b when the two are assembled together.

A U-shaped, rubber (Neoprene, for example) bumper 63 is shown in FIG. 3 seated on the edges of the metal defining opening 62. Bumper 63 functions to protect the edges of the stamped housing about opening 62 when excessive rotational movement occurs between the clamp arm and the housing. A similar bumper can be provided by an H-shaped rubber extrusion 64 (FIG. 11) seated on the edges of stamped housing halves 21a and 21b when the halves are placed together in the process of assembling damper 10. In such a case, a bumper is provided in opening 62 by simply extending extrusion 64 into the opening a relatively short distance. With rotational movement of the clamp arm toward bumper 63 or the ends of extrusion 64, and vice versa, 63 or 64 are present to protect the edges of housing 21 that are located in 63 or 64.

The H-shape of extrusion 64, in addition, can serve as a "tolerance eater" for the damper components.

The enlarged, circular portion 16 (FIG. 6) of clamp arm 12 is substantially larger than the upper opening 62 provided in housing 21. If for any reason, the elastomer members 28 should fail, the clamp arm will not pass through opening 62. This retains the heavy weights 28 on the overhead conductor so that they cannot fall to earth, thereby avoiding any danger to personnel working under the conductor.

When the ends of elastomer members 28 are seated against the seats 26 of housing 21 and against the opposed surfaces 18 of the clamp arm, in the process of adhesively securing these components together, no relative movement of these components should take place until the adhesive is dry. When these components are assembled, the stamped halves of housing 21 are located about clamp arm 12 in a manner which centers the clamp arm in opening 62; this centering is important in that with relative rotational movement of the housing and clamp arm, the distance of travel between the clamp arm and the edges of the housing that define opening 62 should be substantially equal in both directions of such movement. Otherwise, when the conductor vibrates, relative rotational movement of the clamp arm and stamped housing may be restricted to one direction of rotation, which would limit, if not prohibit, outright damping of conductor vibration.

Therefore, the present invention provides a method and means to prevent relative movement of the components when the elastomer members are disposed for bonding to the clamp arm and housing halves. And this is accomplished inexpensively, as the accomplishing means is a simple pull pin 66 insertable into slots 24 of flanges 22 and through drilled hole 15 provided in the clamp arm. Hole 15 and slots 24 are angularly located with respect to opening 62 to position arm 12 in the rotational center of 62 when hole 15 and slots 24 are aligned. With the elastomer members seated in the layers of adhesive placed on the surfaces of the clamp arm and housing halves, hole 15 is aligned with slots 24, and pin 66 inserted in one slot through hole 15 and through the other slot 24. The pin remains therein until the adhesive is dry. When the adhesive is dry, the pin is pulled from the device, leaving the arm centered in opening 62 by the neutral torsion of the elastomer members in an at-rest position. And, when damper 10 is attached to a conductor (14), the clamp arm will be centered in opening 62, and the weight halves located at an approximately 45° angle (FIG. 1) with respect to the vertical of damper 10.

If rivet pin 36 is employed to secure the stamped halves about the elastomer members and clamp arm, the weight halves need not be secured together about the stamped halves when the elastomer members are bonded to arm 12 and stamped halves 21a and 21b. If pin 36 is not used, the weight halves are secured to the lower portion (31 and 32) of the housing 21 by roll pins 56. Pins 56 are first inserted into holes 58 of one weight half and one stamped half (21a or 21b) placed against the inside surface of the weight half, with the roll pins extending through openings 59 provided in the stamped half. The adhesive is now applied to seat 26 of the stamped half and one elastomer member seated against 26. Coil spring 60 can now be inserted in this elastomer member or in the next one. Adhesive is now applied to the surfaces 18 of clamp arm 12 and the other stamped half, and the second elastomer seated in place between them. The other weight half is forced on the roll pins to secure the components together, and pull pin 66 is inserted through 24 and 15 to center the clamp arm in 62 until the adhesive is dry. In this manner the weight halves function as a jig to hold the components together for the drying process. The damper of the invention thereby is quickly and inexpensively assembled.

Another cost-saving feature of the present invention lies in the use of the tubular-shaped elastomer members 28. Since it is preferred that such members have a constant diameter and wall thickness, such members can be made by simply extruding a long hollow "sausage," and then cutting the same into the lengths appropriate for damper 10. The cutting can be rapid by the use of known, available cutting means provided on lathes such that the manufacture of elastomer members 28 is rapid and inexpensive, i.e., unit costs are very low.

While the invention has been described in terms of preferred embodiments, the claims appended hereto are intended to encompass all embodiments which fall within the spirit of the invention.

What is claimed is:

1. A device for damping vibrations of an overhead conductor comprising:
   a weight member comprised of opposed weight halves each having a spherical outer surface, said weight halves being made of a relatively heavy metal material cast in a sand-casting mold,
   a clamp arm,
   opposed hollow elastomer damping members,
   a housing structure made from stamped metal components located between the weight halves and resiliently securing said damping members between the clamp arm and opposed sides of the housing structure, and
   pin means securing the weight halves and housing structure together.

2. The damping device of claim 1 in which the pin means securing the weight halves and housing structure together comprises:
   two roll pins,
   internal recesses located wholly within the weight halves and receiving the ends of the roll pins, and
   openings provided in the housing structure, said roll pins extending through said openings and into the recesses located in the weight halves.

3. The damping device of claim 1 in which the housing structure is comprised of two stamped halves secured together by the pin means that secures the housing structure and weight halves together.

4. The damping device of claim 3 in which the stamped halves are resilient structures adapted to allow for manufacturing tolerances when the components of the device are assembled and secured together.

5. The damping device of claim 3 in which the stamped halves each have a spherical wall portion to minimize corona when the device is attached to an electrical conductor.

6. The damping device of claim 3, including:

further pin means extending through the centers of the damping members and through the stamped halves of the housing structure, and a coil spring located around said further pin means and extending between the clamp arm and stamped halves to electrically connect the clamp arm and stamped halves together, said further pin means securing the damping members, coil spring, clamp arm and stamped halves together.

7. The damping device of claim 6 in which the coil spring is made of a thin gauge spring wire wholly contained within one of the damping members, the gauge of the wire being such that it does not affect the damping effort of the damping members and has low stress when flexed such that the spring has a long fatigue life.

8. The damping device of claim 3 in which the stamped halves are each provided with a rib structure, said rib structures providing structural stiffness to the stamped halves, and said rib structures also providing an opening in the lower portion of the housing structure to permit moisture or water that may enter the housing structure to drain therefrom.

9. The damping device of claim 3 in which the weight halves are provided with relatively shallow ball-like recesses, and the stamped halves are provided with relatively shallow ball-like protrusions such that when the device is assembled, the protrusions seat in the recesses and all loads in a direction perpendicular to the axes of the protrusions are placed on the protrusions.

10. The damping device of claim 3 in which an opening is provided in the housing structure when the stamped halves are brought together to form the housing structure, with the clamp arm extending through said opening, the edges of the stamped halves located about the clamp arm providing means to limit relative motion between the clamp arm and housing structure.

11. The damping device of claim 10 in which the clamp arm is provided with a flange or skirt structure that shields the opening from sunlight.

12. The damping device of claim 10 including a U-shaped elastomer means seated on the edges of the stamped halves about the clamp arm, said elastomer means serving as a protective bumper structure for the clamp arm and stamped halves.

13. The damping device of claim 10 including an elastomer strip seated on and along the edges of the stamped halves, said strip extending beyond the edges of the stamped halves located about the clamp arm, said strip serving as a seal between the stamped halves when the halves are assembled together about the clamp arm and damping members, and as a protective bumper means between the clamp arm and stamped halves.

14. The damping device of claim 3 in which the stamped halves are each provided with cup-shaped wall portions with the ends of the damping members being seated in said wall portions.

15. The damping device of claim 1 in which the housing structure is provided with a peripheral slot and a removable pin insertable into said slot, said pin and slot being effective to relatively rotationally orient the housing structure and clamp arm at the same angle.

16. The damping device of claim 1 in which the damping members are made from a thin-wall, substantially pure silicone material, said material being relatively soft across a large range of ambient temperatures such that its torsional stiffness does not change substantially with changes in ambient temperature.

17. The damping device of claim 16 in which thin walls of the hollow damping members provide substantial surface area for cooling of the hollow damping members.

18. The damping device of claim 1 in which the width of the housing structure is sized relative to the length of the elastomer damping members to compress the same in the housing structure such that the walls of the damping members bulge outwardly at a location adjacent the longitudinal centers thereof.

19. The damping device of claim 1 in which air is captured in the hollow damping members when the housing structure engages and is pressed against the ends thereof.

20. The damping device of claim 1 in which the damping members are tubular shapes having outside diameters that are greater than the lengths of the damping members such that they are structurally stable, and the ends thereof present uniform bearing surfaces and pressures against the walls of the housing structure when assembled together.

21. The damping device of claim 1 in which a layer of elastic silicone adhesive is located between the ends of the damping members and the walls of the housing structure.

22. The damping device of claim 1 in which the weight member is provided with two recesses such that a portion of the housing structure is located in one recess, while the other recess locates the center of gravity of the weight member adjacent the radial center thereof.

23. The damping device of claim 22 in which the recess that accommodates the portion of the housing structure is larger than said portion so that the weight member does not bear against a major portion of the housing structure.

* * * * *